Jan. 28, 1930.  J. H. PARSONS  1,745,186
VENTILATOR FOR AUTOMOBILE WINDOWS
Filed Nov. 15, 1924   2 Sheets-Sheet 1

John H. Parsons
INVENTOR

BY Rex Frye.
ATTORNEY

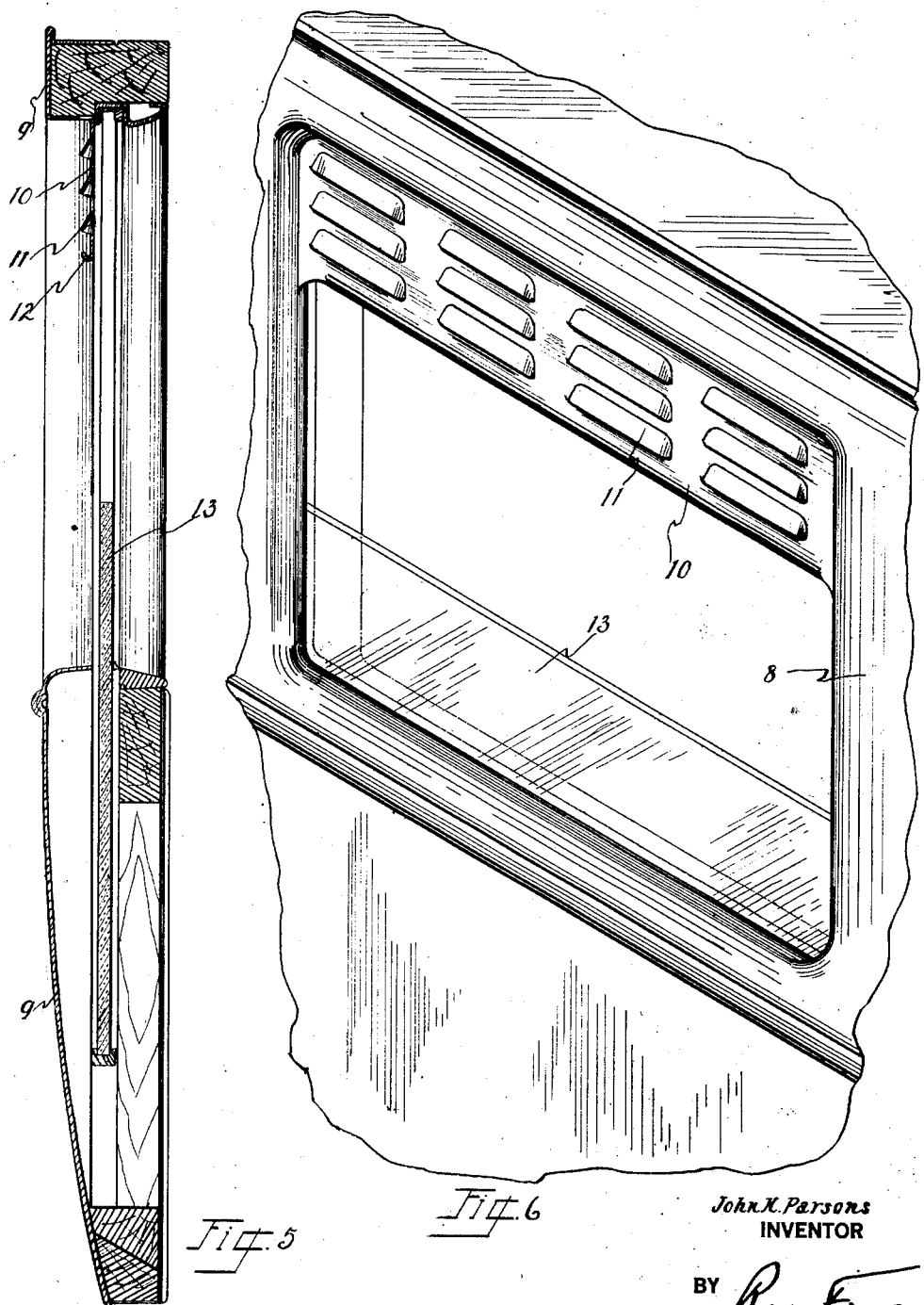

Patented Jan. 28, 1930

1,745,186

UNITED STATES PATENT OFFICE

JOHN H. PARSONS, OF PONTIAC, MICHIGAN

VENTILATOR FOR AUTOMOBILE WINDOWS

Application filed November 15, 1924. Serial No. 750,158.

This invention relates to ventilators for automobile windows and has for its principal object the provision of a ventilator adjacent the top of a window to permit the circulation of air through the car whenever desired without draft upon the occupants.

Another object of the invention is the rigid mounting of a window ventilator upon a portion of the body adjacent the top of an automobile window so as to prevent rattling during the travel of the car and permit the complete closing of the window when desired.

A further object of the invention is the mounting of a window ventilator as a unitary part of the metallic panel covering the window frame, either by forming it integrally with such panel or permanently securing it thereto, as by welding, whereby the ventilator may be constructed substantially as part of the car body.

Other objects and advantages will be apparent from the following description, wherein reference is made to the accompanying drawings illustrating preferred embodiments of my invention and wherein similar reference numerals designate similar parts throughout the several views.

In the drawings:

Fig. 1 is a side elevation of an automobile equipped with my improved ventilator.

Figs. 2 and 3 are detail vertical sections taken substantially on the lines 2—2 and 3—3 of Fig. 1.

Fig. 5 is an enlarged vertical section through a door showing the mounting of the ventilator adjacent to but out of the path of the window pane, and Fig. 6 is a detail perspective view of the metallic panel utilized as a cover for the window frame, with my ventilator formed as an integral part thereof.

Figure 1:
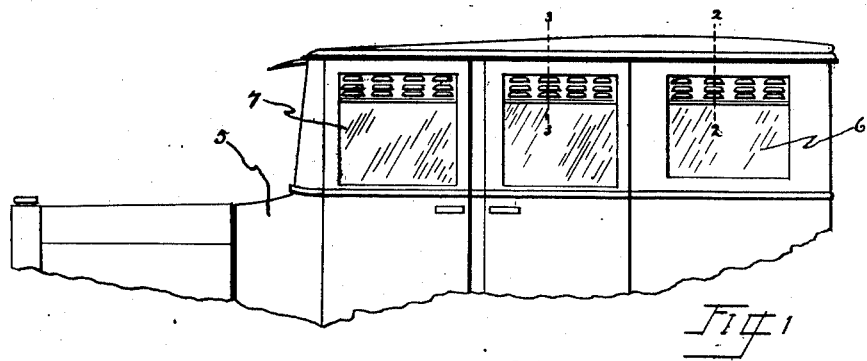

Referring now to the drawings the numeral 5 designates an automobile of the sedan type having a plurality of windows 6 and 7 on each side of the closed body, which windows are mounted so that they may be raised or lowered any desired distance from the position shown in Fig. 1.

Ordinarily when one or more of the windows are lowered, the inrush of air therethrough when the car is moving forms a draft upon the occupants of the car. On the other hand, if the windows are kept closed the interior of the vehicle becomes uncomfortably hot and stuffy. Particularly when one or more of the passengers are smoking, it soon becomes necessary that a window be opened. My improved ventilator permits the lowering of one or more of the windows for a portion of its travel without the objectionable draft resulting, inasmuch as the incoming air is directed upwardly toward the top of the car in small jets or currents.

Figures 2, 3:
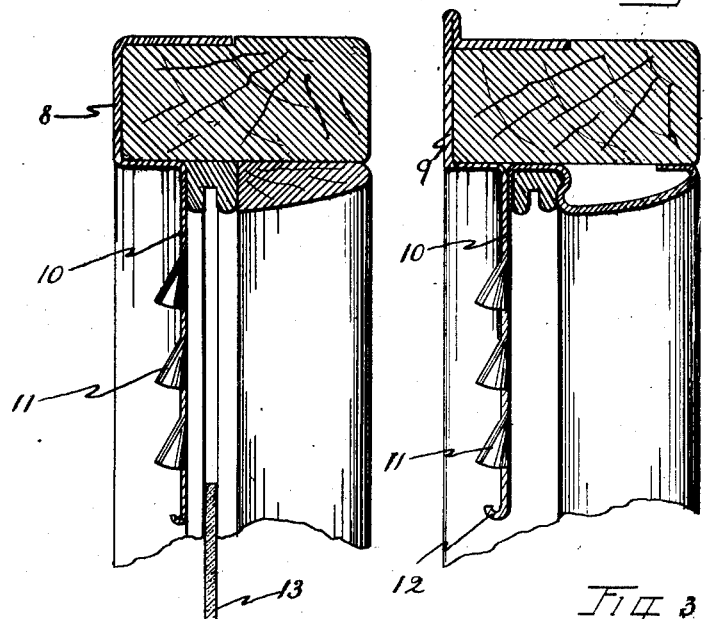

My improved ventilator is herein shown as comprising an integral part of the metallic panel forming part of the automobile body and covering the window frame. Thus in Figs. 1, 2 and 6 is shown a metallic panel 8 arranged as part of the rear portion of the automobile body, which portion is permanently secured in the position shown, and in Figs. 1, 3 and 5 is shown a panel 9 forming a portion of a swinging door. It is customary in building bodies for closed cars to provide the permanently fixed panels 8 and the movable panels 9 and cut therefrom the openings through which light and air are admitted to the car. Such panels are utilized as the outside cover for the window frames and operating mechanism for raising and lowering the panes. My improved ventilators may be formed during the shaping operations for panels 8 and 9 and thus form an integral part of the cover panel. Thus, the ventilator is formed with a body portion 10 paralleling the path of travel of the window pane 13 and pressed inwardly from the outer face of the vehicle body (note Fig. 5) to a position closely adjacent the upper portion of the window pane when it is in closed position. A plurality of inlet openings 11 are formed by cutting the body portion 10 at predetermined intervals and then bending outwardly the material directly above such cuts to substantially the position shown in Figs. 2 and 3. The ventilator is also preferably stiffened to prevent lateral bending or vibration by the outward and upward bending of the lower edge of the body portion 10 into a bead or rearwardly inclined trough 12 to trap moisture descending on the face of the ventilator and lead it off adjacent the side of the window. The arrangement of the intake openings 11 is such that the inrushing air is directed upwardly toward the top of the car in a series of small jets or currents, which thoroughly ventilate the car without a direct draft upon the occupants. Moreover, when the vehicle is moving, a suction is formed adjacent the sides of the vehicle whereby the air within the car is ejected.

As best shown in Fig. 5 the mounting of my improved ventilator in no way interferes with the travel of the window pane 13, and when it is desired to open the windows to their full extent or substantially so, no obstruction prevents. This permits the usual use of a sedan with fully open windows in summer.

On days, however, when the wide opening of the windows would be objectionable, my ventilator is of great value. The pane 13 is then lowered to substantially the position shown in Fig. 2 to admit inrushing currents of air through the ventilator openings. Should the temperature of the air render such incoming air objectionably cold, one or more rows of the inlet openings may be cut off by moving the window upward as desired.

Figure 4:
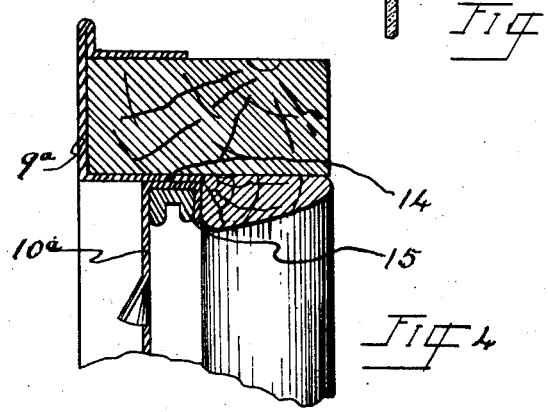
Fig. 4 is a detail sectional view substantially similar to Fig. 3 but illustrating a modified embodiment of the invention.

In Fig. 4 I have shown my ventilator as formed from a separate sheet of metal and welded or otherwise secured to the cover panel 9ª. In this construction the body portion 10ª of the ventilator may be bent rearwardly and then downwardly to form a channel 14 for retaining the grooved guide strip 15 in which the upper edge of the window pane fits when the window is completely closed.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim:

1. An automobile body construction, a metallic cover panel having an aperture therein for an automobile window, the material of the panel adjacent one end of the window aperture being shaped to form a ventilator integral therewith and positioned inwardly of the outer face of the panel to lie closely adjacent the path of the window pane used in such window.

2. In automobile body construction, a metallic panel having an aperture therein for an automobile window, the material of the panel adjacent such aperture being inwardly bent toward the path of travel of the window pane used in such window, and the material of the panel adjacent the top of the window being then bent downwardly and perforated to form a ventilator adapted to lie closely adjacent the path of the window pane.

3. In automobile body construction, a metallic cover panel having a substantially large aperture therein adapted to be closed to the degree required by the movement of a window pane in a plane substantially coincident with the inner edge of the panel, the portion of the panel adjacent the top of the aperture being integral with the cover panel and positioned just outside of the plane of travel of the window pane and being plurality apertured by spacedly cutting the panel and then bending outwardly the material directly above the cuts.

4. In automobile body construction, a metallic cover panel having a substantially rectangular aperture therein adapted to be closed to the degree desired by the movement of a window pane in a plane substantially coincident with the inner edge of the panel the portion of the panel adjacent the top of the aperture being integral with the panel and positioned substantially parallel with and just outside of the plane of travel of the window pane and being plurally apertured by spacedly cutting the panel and then bending outwardly the material directly above such cuts.

In witness whereof I hereunto set my hand.

JOHN H. PARSONS.